United States Patent [19]

Zanker

[11] 4,215,565
[45] Aug. 5, 1980

[54] METHOD AND APPARATUS FOR TESTING A FLUID

[75] Inventor: Klaus J. Zanker, Four Marks, England

[73] Assignee: Agar Instrumentation Inc., Houston, Tex.

[21] Appl. No.: 943,899

[22] Filed: Sep. 19, 1978

Related U.S. Application Data

[63] Continuation-in-part of Ser. No. 829,997, Sep. 1, 1977, abandoned.

[30] Foreign Application Priority Data

Aug. 7, 1978 [GB] United Kingdom ............... 32495/78

[51] Int. Cl.³ .......................... G01F 1/68; G01F 5/00; G01N 1/14; G01N 9/00
[52] U.S. Cl. .......................................... 73/30; 73/202; 73/204; 73/349; 73/422 R; 73/421.5 R
[58] Field of Search .............. 73/23, 30, 32 A, 194 R, 73/200, 202, 204, 205 R, 211, 349, 421.5 R, 421.5 A, 422 R, 212; 137/599, 599.1

[56] References Cited

U.S. PATENT DOCUMENTS

| | | | |
|---|---|---|---|
| 3,000,213 | 9/1961 | Eves et al. | 73/204 X |
| 3,246,515 | 4/1966 | Martino et al. | 73/204 |
| 3,459,047 | 8/1969 | Sumansky | 73/421.5 A |
| 4,018,089 | 4/1977 | Dzula | 73/422 |

FOREIGN PATENT DOCUMENTS 568024  8/1977  U.S.S.R. .................................. 73/202

*Primary Examiner*—S. Clement Swisher
*Attorney, Agent, or Firm*—Beveridge, DeGrandi, Kline & Lunsford

[57] ABSTRACT

A method of testing a fluid is disclosed which comprises passing a main flow of a fluid through a conduit; inserting into said conduit a probe having an inlet opening which faces downstream of the conduit, or is disposed in a chamber communicating with the conduit, the inlet opening communicating with an outlet opening which is disposed in an end surface of the probe; the said main flow, in passing through the conduit, causing a sampling flow of the fluid to be drawn from the conduit, and to be passed through the probe from the inlet opening to the outlet opening, and so back to the conduit; and testing said sampling flow.

24 Claims, 13 Drawing Figures

METHOD AND APPARATUS FOR TESTING A FLUID

BACKGROUND OF THE INVENTION

This application is a continuation-in-part of U.S. application Ser. No. 829,997 filed 1st Sept. 1977 by Klaus Joachim Zanker for "Method and Apparatus for Testing a Fluid" now abandoned.

This invention concerns a method and an apparatus of testing a fluid, e.g. to determine a parameter of parameters thereof, such as its mass flow, density, temperature, pH, or conductivity, or to effect a chemical and/or physical analysis such as its percentage content of oxygen. The invention is also applicable to the simultaneous determination of a plurality of parameters, e.g. the simultaneous determination of density and temperature.

The testing of a fluid to determine a parameter thereof, such as its density, is commonly effected by passing a main flow of the fluid through a conduit, inserting into said conduit a probe having an inlet opening which faces upstream of the conduit and which communicates with an outlet opening which faces downstream thereof, and employing a density or other meter to test the sampling flow which passes through the probe so as to determine said parameter. The inlet opening may have a dirt guard thereover so that the sample flow is caused to make two sharp bends before entering the meter, whereby to reduce the amount of dirt entering the latter. Even so, the amount of dirt which can enter the meter in such case is still fairly considerable.

It is therefore the object of the present invention to provide a method and an apparatus for testing a fluid in which the amount of dirt which will be carried in said sampling flow will be substantially reduced.

SUMMARY OF THE INVENTION

According to one aspect of the present invention, there is provided a method of testing a fluid comprising passing a main flow of fluid through a conduit, inserting into said conduit, or into a chamber communicating with said conduit, a probe having an inlet opening which faces downstream with respect to the conduit and which communicates with an outlet opening which is disposed in an end surface of the probe, the said end surface being disposed within and spaced from the wall of the conduit; the said main flow, in passing through the conduit, causing a sampling flow of the fluid to be drawn from the conduit, and to be passed through the probe from the inlet opening to the outlet opening, and so back to the conduit; and testing said sampling flow.

Alternatively, if the probe is inserted into the said chamber so that the inlet opening is disposed in the chamber and is open to the static pressure in the conduit, then it is not essential that the inlet opening faces downstream.

The term "conduit" is used herein in a wide sense to include, for example, open channels, pipes and rivers.

The probe is preferably a cyclindrical probe, e.g. a circular cylindrical probe. A circular cylindrical probe is particularly suitable for pipeline use because of the ease of drilling a circular hole in the pipeline through which to introduce and seal the probe. However, the probe may be constituted by any bluff body, e.g. a bluff body having sharp edges such as may be provided by virtue of the bluff body having square rectangular or triangular end surfaces.

The said main flow fluid may be dirty or otherwise contaminated or may have more than one phase.

According to another aspect of the present invention, there is provided apparatus for testing a fluid comprising a conduit through which a main flow of a fluid may be passed; a probe inserted in said conduit or in a chamber communicating with said conduit, said probe having an inlet opening which faces downstream with respect to the conduit and which communicates with an outlet opening which is disposed in an end surface of the probe, the said end surface being disposed within and spaced from the wall of the conduit, the said main flow, in passing in operation through the conduit, causing a sampling flow of the fluid to be drawn from the conduit and to be passed through the probe from the inlet opening to the outlet opening and so back to the conduit; and testing means for testing said sampling flow.

Preferably the said testing means is mounted in said probe.

The said testing means may be a flow meter.

Alternatively, the said testing means may comprise a density meter, the density meter comprising a sensing tube through which in operation the said sampling flow passes, and means for oscillating said sensing tube and for determining from the oscillation thereof the density of the sampling flow.

The outlet opening may be disposed in a reduced diameter end surface of the probe. The pressure in the inlet opening is preferably substantially equal to the static pressure in the conduit. Moreover, the inlet opening is preferably disposed in a recess in the conduit.

Alternatively, as indicated above, the probe of the said apparatus may be inserted into said chamber so that the inlet opening is disposed in the chamber and is open to the static pressure in the conduit, and in this case it is not essential that the inlet opening faces downstream.

The inlet opening may communicate with a passage which leads to a recess in the probe, said recess having a diameter which is substantially greater than that of the passage, and said recess having an open end which constitutes the said outlet opening.

A shield may be mounted on the probe to shield the said outlet opening.

DESCRIPTION OF THE PREFERRED EMBODIMENTS

The invention is illustrated merely by way of example in the accompanying drawings, in which:-

Figure 12:
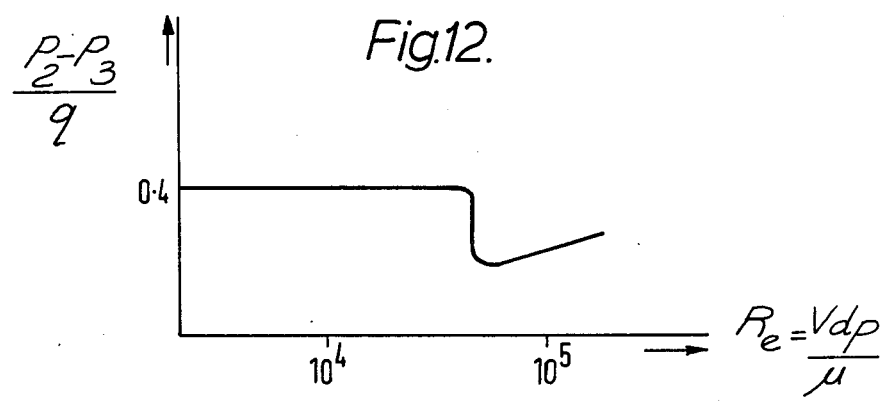
Figure 13:
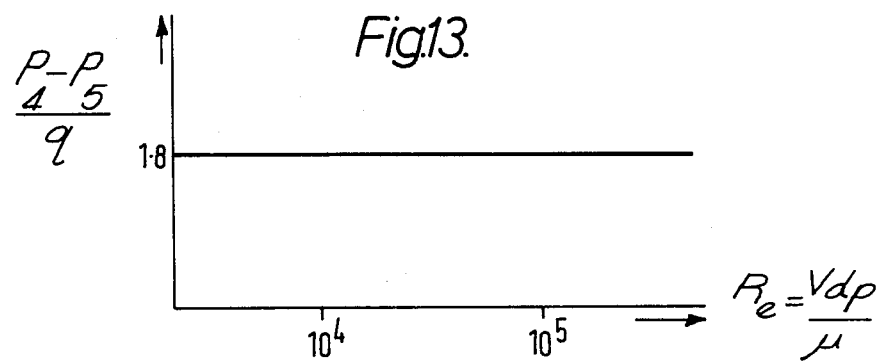
Figure 3:
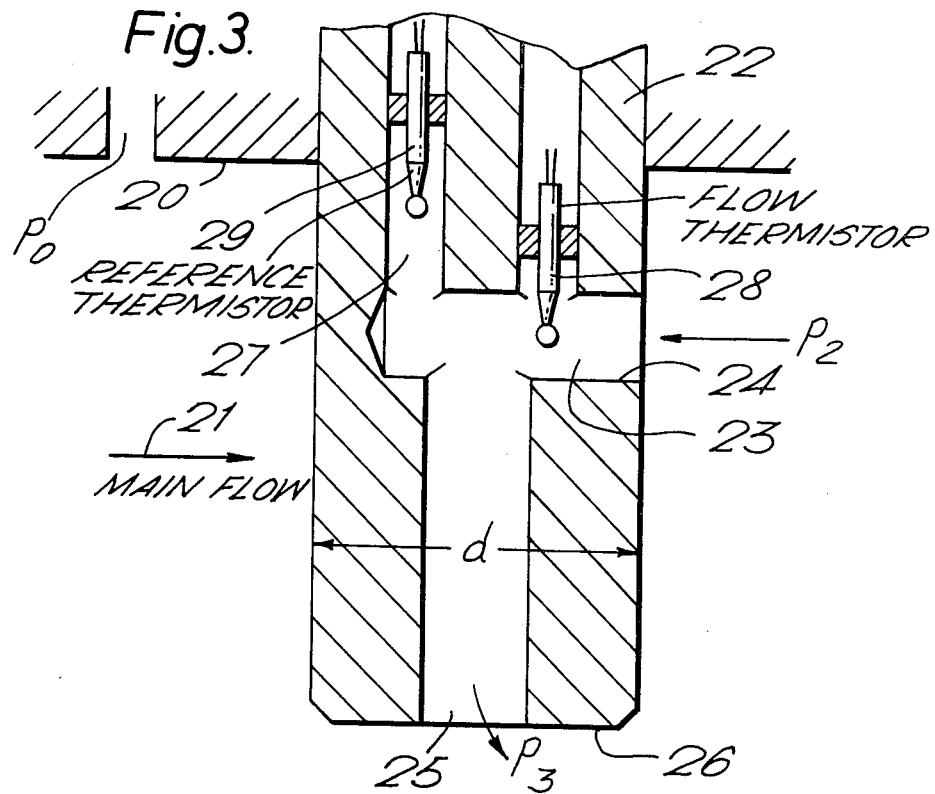
Figure 4:
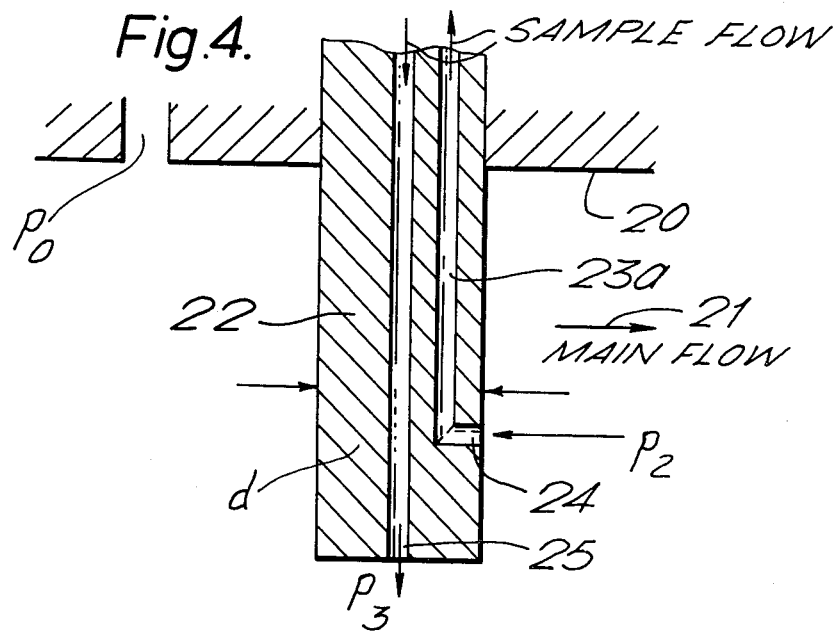
Figure 5:
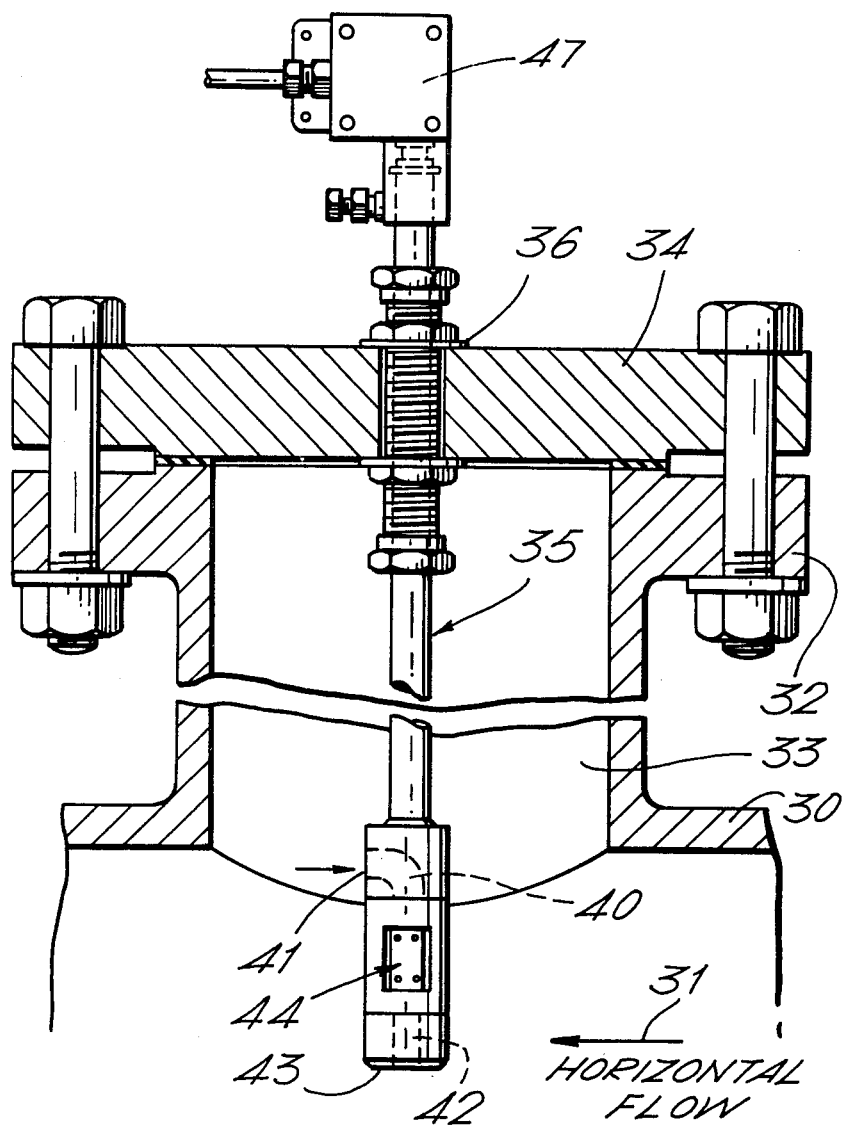
Figure 6:
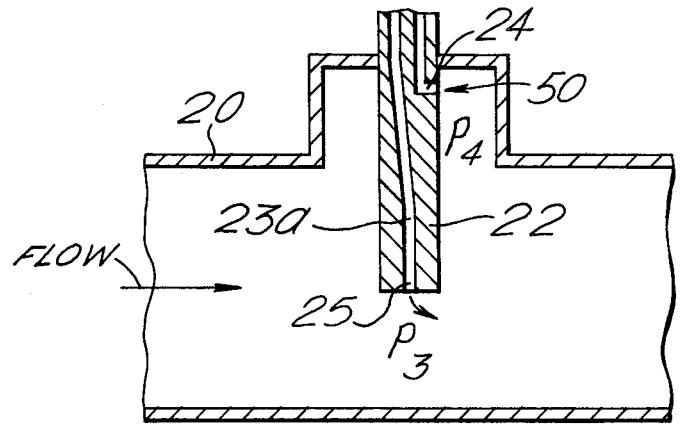
Figure 7:
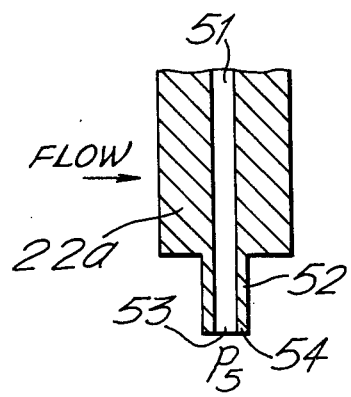

FIG. 3 is a schematic drawing showing a first embodiment of an apparatus according to the present invention, FIG. 4 is a schematic drawing showing part of a second embodiment of an apparatus according to the present invention, FIG. 5 is a broken-away sectional view showing a third embodiment of an apparatus according to the present invention, FIG. 6 is a schematic drawing showing part of a third embodiment of an apparatus according to the present invention, FIGS. 7 to 11 are schematic drawings of various probes which may be used in an apparatus according to the present invention, and FIGS. 12 and 13 are graphs illustrating the operation of the embodiments shown in FIGS. 4 and 7 respectively.

Figure 1:
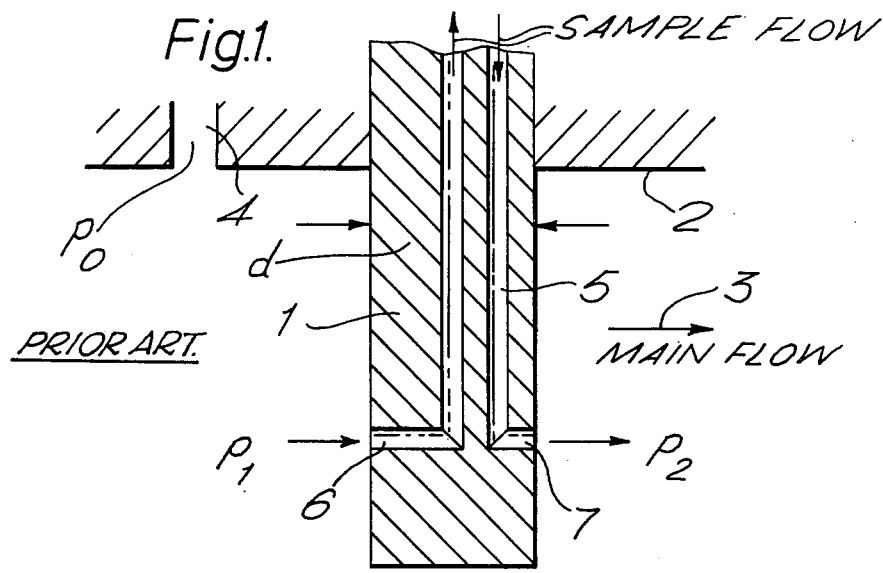
FIG. 1 is a schematic drawing showing a known apparatus for testing a fluid.

In FIG. 1 there is illustrated diagrammatically a known apparatus for testing a fluid comprising a probe 1, having a diameter d, which is inserted in a conduit 2, the conduit 2 having a main flow 3 passing therethrough. The static pressure $P_o$ in the conduit 2 may be measured by measuring the pressure in a passage 4 communicating with the conduit 2.

The probe 1 has a sampling flow passage 5 therethrough. The sampling flow passage 5 has an inlet opening 6 which faces upstream of the conduit 2 and in which a pressure $P_1$ prevails, and an outlet opening 7 which faces downstream of the conduit 2 and in which a pressure $P_2$ prevails. The sampling flow passage 5 communicates with a density or other meter (not shown) to test the sampling flow which passes through the passage 5.

Figure 2:
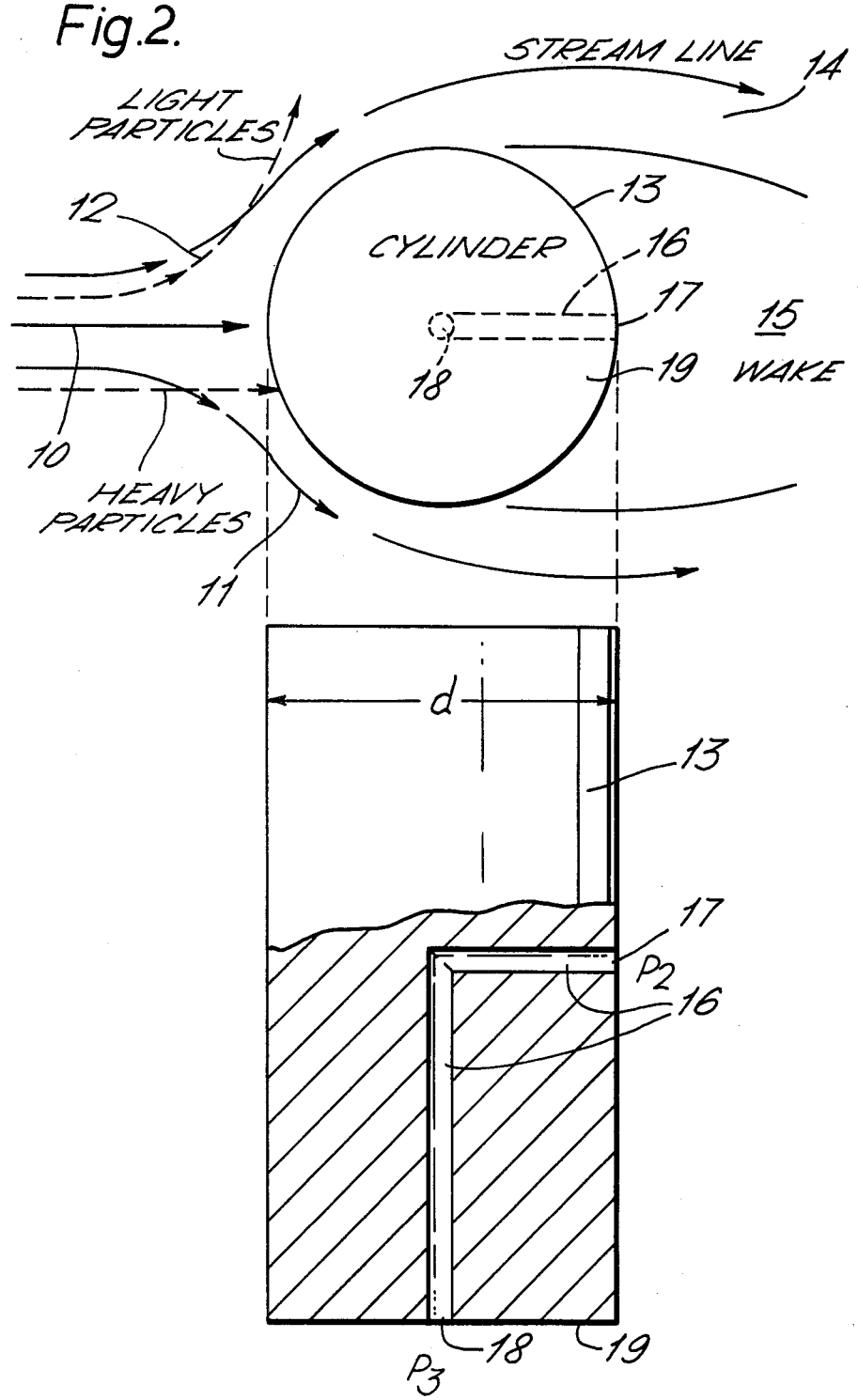
FIG. 2 is a flow diagram illustrating the principle of the present invention.

The prior art construction shown in FIG. 1 suffers from severe dirt problems by reason of the fact that the inlet opening 6 faces upstream. In FIG. 2 there is therefore illustrated a construction according to the present invention which does not employ an upstream facing inlet opening.

In FIG. 2 there is illustrated diagrammatically a flow 10 of a fluid which contains heavy particles 11 and light particles 12. A cylinder 13, having a diameter d, is shown as being in the direct flow path of the flow 10 and, as will be seen from FIG. 2, the flow 10 produces streamline flow in a region 14 around the cylinder 13, and a wake region 15 immediately downstream of the cylinder 13.

The heavy particles 11 in the flow 10 collide with the cylinder 13, while the light particles 12 are merely deflected radially by the cylinder 13. Consequently, the wake region 15 is relatively free of either the light particles 12 or the heavy particles 11.

If therefore the cylinder 13 is provided with a passage 16 therethrough having an inlet opening 17, which faces *downstream* of the flow 10 and is disposed in the wake region 15, and an outlet opening 18, which is disposed in an end surface 19 of the cylinder 13, then fluid from the wake region 15 will flow through the inlet opening 17, where a pressure $P_2$ prevails, into the passage 16, and then out through the outlet opening 18, where a pressure $P_3$ prevails. This flow through the passage 16 occurs by reasons of the difference in the pressures $P_2$—$P_3$ prevailing at the inlet opening 17 and at the outlet opening 18 respectively. This flow of fluid through the passage 16 will be relatively free of both the heavy particles 11 and the light particles 12 and therefore will be very suitable for use as a sampling flow to be passed through a meter for determining a parameter of the fluid, e.g. its mass flow or its density.

In FIG. 3 there is therefore shown a schematic view of a first embodiment of an apparatus according to the present invention.

Referring to FIG. 3, a conduit 20, having a static pressure $P_o$ therein, has a main flow 21 passing therethrough, and this main flow 21 may be that of a dirty or otherwise contaminated fluid or may be that of a fluid having two or more phases. A substantially cylindrical probe 22 is inserted into the conduit 20, the probe 22 having a sampling flow passage 23 therethrough. The sampling flow passage 23 has an inlet opening 24 which faces downstream of the conduit 20 and an outlet opening 25 which is disposed in an end surface 26 of the probe 22, the end surface 26 being disposed within and spaced from the wall of the conduit 20. Consequently, as explained above with reference to FIG. 1, the main flow, in passing through the conduit 20, causes a sampling flow of the fluid to be drawn from the conduit 20 and to be passed through the sampling flow passage 23 in the probe from the inlet opening 24 to the outlet opening 25 and so back to the conduit 20. Since this sampling flow is constituted by fluid which is drawn from the wake region on the downstream side of the probe 22, it contains very little dirt or other contamination. Moreover, if the fluid in the conduit 20 is two phase, the sampling flow will be that of the clean base fluid. In contrast therefore to the prior art, the inlet opening 24 will not become swiftly clogged with dirt.

The sampling flow passage 23, which in operation has a continuous flow of fluid passing therethrough, communicates with a chamber 27 which is closed except at its end communicating with the sampling flow passage 23. Thus the fluid in the chamber 27 is relatively stagnant.

A "flow" thermistor 28 is mounted in the sampling flow passage 23, while a "reference" thermistor 29 is mounted in the chamber 27. The thermistors 28, 29 form part of a flow meter of the kind disclosd in British Pat. No. 1,463,507 the description of which is incorporated herein by reference.

It will therefore be appreciated that the construction shown in FIG. 3 is such as to prevent any significant quantity of dirt or other contamination from passing through the flow meter.

The construction shown in FIG. 4 may be arranged to be generally similar to that of FIG. 3 and for this reason will not be described in detail, like reference numerals indicating like parts. In the construction of FIG. 4, however, a sampling flow passage 23a is employed which passes outwardly of the conduit 20 to and from a flow or other meter, not shown.

In FIG. 5 there is shown a still further embodiment according to the present invention in which a main conduit 30 has a main or horizontal flow 31 therethrough of a dirty or otherwise contaminated fluid. The conduit 30 has a flange member 32 whose interior 33 communicates with the interior of the main conduit 30, the outer end of the flange member 32 being closed by an end plate 34. Extending through the end plate 34 so as to project into the horizontal flow 31 is a generally cylindrical probe 35 which is sealed to the end plate 34 by a seal 36. The probe 35 has a sampling flow passage 40 therethrough, the latter being provided with an inlet opening 41 which faces downstream of the main conduit 30 and with an outlet opening 42 which is disposed in an end surface 43 of the probe 35. The horizontal flow 31, in passing through the main conduit 30, causes a sampling flow of the fluid to be drawn through the sampling flow passage 40 from the inlet opening 41 to the outlet opening 42 and so back to the main conduit 30.

The sampling flow passage 40 has a density meter 44 connected therein, e.g. of the kind shown in British Pat. No. 1,175,586 the description of which is incorporated herein by reference.

A density meter of the kind illustrated at 44 is extremely sensitive to dirt, since any such dirt can effect the oscillations of a sensing tube (not shown) thereof or can even prevent the latter from oscillating at all. However, the construction shown in FIG. 5 ensures that the sampling flow which passes through the density meter 44 contains substantially no dirt, however dirty may be the fluid passing through the main conduit 30.

In the prior art construction shown in FIG. 1, the following parameters typically have the following values:

$$(P_1-P_o)/q=1.0,$$

$$(P_2-P_o)/q=-0.8,$$

$$(P_1-P_2)/q=1.8,$$

where $q=\tfrac{1}{2}\rho V^2=$ the velocity head, $\rho=$ the density of the fluid passing through the conduit 2, and $V=$ the velocity of the fluid through the conduit 2.

Although, therefore, the prior art construction shown in FIG. 1 has severe dirt problems, it does have good low flow sensitivity since this construction will satisfactorily sense a value of $P_1-P_2$ equivalent to a flow as low as 0.06 m/s in air.

In the construction shown in FIGS. 3 and 4, the following parameters typically have the following values:

$$(P_3-P_o)/q=-1.2.$$

$$(P_2-P_3)/q=0.4.$$

Thus although the constructions shown in FIGS. 3 and 4 give better dirt immunity than the prior art since their inlet openings 24 face *downstream,* and although these constructions are very satisfactory for most conditions, they are not satisfactory for very low flows since they will not satisfactorily sense a value of $P_2-P_3$ equivalent to a flow of less than 0.2 m/s in air.

In FIG. 6 there is therefore shown a further embodiment of the present invention which is generally similar to that of FIG. 4 and which for this reason will not be described in detail, like reference numerals indicating like parts. In the FIG. 6 construction, however, the inlet opening 24 is disposed within and communicates with a recess or chamber 50 which communicates with the conduit 20 and forms a "pocket" or recess therein. A pressure $P_4$, which is substantially equal to the static pressure $P_o$, prevails in the inlet opening 24. The concentration of dirt in the chamber 50 would be generally less than in the main portion of the conduit 20, while the fluid in the chamber 50 would be relatively stagnant and thus much less subject to any eddies or noise in the main portion of the conduit 20. The higher pressure in the chamber 50 also increases the sensitivity.

In the case of the FIG. 6 construction, $$(P_4-P_3)q=1.2.$$

Thus the pressure difference $P_4-P_3$ of the FIG. 6 construction is three times greater than the pressure difference $P_2-P_3$ of the construction of FIGS. 3 and 4, so that the FIG. 6 construction is very suitable for use with low flows.

A further advantage of the FIG. 6 construction is that, since the fluid in the chamber 50 is relatively stagnant, it is not necessary for the inlet opening 24 to face "downstream", because the provision of the inlet opening 24 in the stagnant chamber 50 will of itself substantially reduce the amount of dirt which will be entrained therethrough. Consequently, the probe can be mounted more easily in the conduit since the angular disposition of the probe is not of importance.

FIG. 7 to 11 illustrate diagrammatically a number of different probes which may be used in the construction shown in FIG. 6 in replacement for the probe shown therein.

Thus in FIG. 7 there is shown a cylindrical probe 22a having an inlet opening (not shown) which is disposed in the chamber 50 of FIG. 6 so that the pressure $P_4$ prevails in the said inlet opening. The inlet opening communicates with a passage 51 which extends through a reduced diameter end portion 52 of the probe 22a. The passage 51 leads to an outlet opening 53 in which a pressure $P_5$ prevails, the outlet opening 53 being disposed in a reduced diameter end surface 54 of the probe 22a. The reduced diameter end portion 52 increases the suction, giving a larger differential pressure, larger flow and better sensitivity.

In the case of the FIG. 7 construction, $$(P_5-P_o)/q=-1.8.$$

$$(P_4-P_e)/q=1.8.$$

Thus the pressure difference $P_4-P_5$ of the FIG. 7 construction is more than four times greater than the pressure difference $P_2-P_3$ of the construction of FIGS. 3 and 4, so that the FIG. 7 construction is very suitable for use with low flows.

Figure 8:
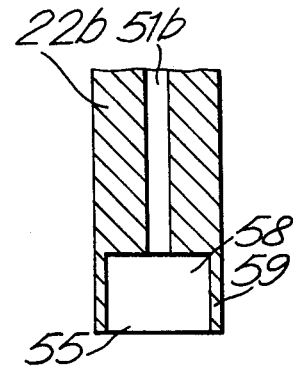

In FIG. 8 there is shown a cylindrical probe 22b having an inlet opening (not shown) disposed in the chamber 50 of FIG. 6 so that the pressure $P_4$ prevails therein. The inlet opening communicates with a passage 51b which leads to a recess 58 in the probe 22b. The recess 58, which has a diameter which is substantially greater than that of the passage 51b, is provided with a thin curved peripheral wall 59. The recess 58 has an open end 55 which constitutes the outlet opening of the probe 22b. The construction shown in FIG. 8 can help improve linearity.

Figure 9:
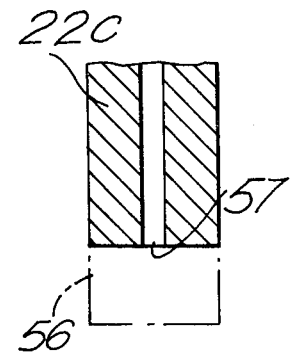

In FIG. 9 there is shown a probe 22c which is generally similar to that of FIG. 6 but which has a shield 56 mounted on the probe to shield its outlet opening 57 from pipeline wall interference effects.

Figure 10:
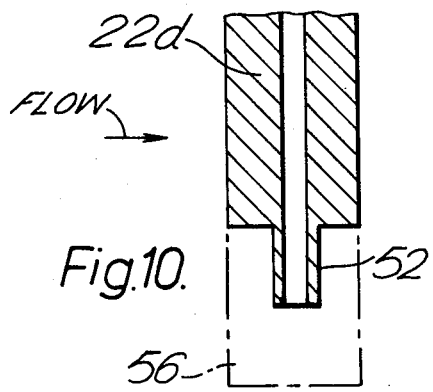

In FIG. 10 there is shown a probe 22d having a reduced diameter portion 52 and other features corresponding to those of the probe 22a of FIG. 7, and being additionally provided with the shield 56 of the FIG. 9 construction.

Figure 11:
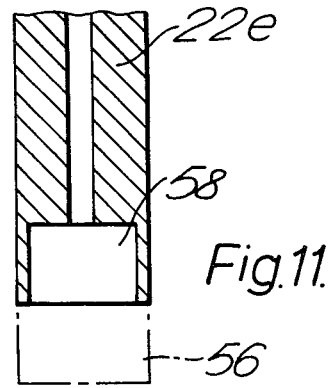

In FIG. 11 there is shown a probe 22e having a recess 58 and other features corresponding to those of the probe 22b of FIG. 8, and being additionally provided with the shield 56 of the FIG. 9 construction.

All the various constructions shown in FIGS. 6 to 11 help to improve low flow sensitivity, increase immunity to dirt, improve linearity over a wider operating range, and allow use of the apparatus in smaller pipes than would otherwise be possible.

In FIG. 12 there is shown a graph illustrating the relationship in the case of the constructions shown in FIGS. 3 and 4, between $(P_2-P_3)/q$ (the ratio of the pressure difference across the probe to the velocity head) and Re, Re being the Reynolds number of the fluid flow through the conduit, and $$Re=Vd\rho/\mu$$

where
d = the diameter of the probe and
μ = the viscosity of the fluid.

As will be seen from FIG. 12, in the case of the construction of FIGS. 3 and 4, there is a linear relationship between $(P_2-P_3)/q$ and Re up to about $7\times10^4$, after which the relationship becomes non-linear due to separation and reattachment phenomena associated with the geometry of the probe and conduit, and the positions of the inlet and outlet openings of the sampling flow passage.

In contrast, there is shown in FIG. 13, a graph illustrating the relationship, in the case of the construction of FIG. 6, between $(P_4<P_5)/q$ and Re. In this case, the said relationship is substantially linear throughout, and there is no sudden discontinuity at $7\times10^4$ or elsewhere. There is also less noise.

The probes shown in any of FIGS. 3 to 5 may, if desired have their end portions modified to the form shown in any of FIGS. 7 to 11.

I claim:

1. A method of testing a fluid comprising passing a main flow of a fluid through a conduit, inserting into said conduit a substantially cylindrical probe having an inlet opening which faces downstream of the conduit and which communicates with an outlet opening which is disposed in an end surface of the probe, the said end surface being disposed within and spaced from the wall of the conduit; the said main flow, in passing through the conduit, causing a sampling flow of the fluid to be drawn from the conduit, and to be passed through the probe from the inlet opening to the outlet opening, and so back to the conduit; and testing said sampling flow.

2. A method as claimed in claim 1 in which the main flow of fluid is dirty.

3. A method as claimed in claim 1 in which the main flow of fluid has more than one phase.

4. A method as claimed in claim 1 in which the sampling flow is tested to determine a plurality of parameters simultaneously.

5. Apparatus for testing a fluid comprising a conduit through which a main flow of a fluid may be passed; a substantially cylindrical probe inserted in said conduit, said probe having an inlet opening which faces downstream of the conduit and which communicates with an outlet opening which is disposed in an end surface of the probe, the said end surface being disposed within and spaced from the wall of the conduit; the said main flow, in passing in operation through the conduit, causing a sampling flow of the fluid to be drawn from the conduit and to be passed through the probe from the inlet opening to the outlet opening and so back to the conduit; and testing means for testing said sampling flow.

6. Apparatus as claimed in claim 5 in which the said testing means is mounted in said probe.

7. Apparatus as claimed in claim 6 in which the said testing means is a flow meter.

8. Apparatus as claimed in claim 6 in which the said testing means comprises a density meter.

9. A method of testing a fluid comprising passing a main flow of fluid through a conduit, inserting a probe into a chamber communicating with said conduit, the side wall of the probe having an inlet opening which is disposed in the chamber and is open to the static pressure in the conduit, the inlet opening communicating with an outlet opening which is disposed in an end surface of the probe, the said end surface being disposed within and spaced from the wall of the conduit; the said main flow, in passing through the conduit, causing a sampling flow of the fluid to be drawn from the conduit, and to be passed through the probe from the inlet opening to the outlet opening, and so back to the conduit; and testing said sampling flow.

10. Apparatus for testing a fluid comprising a conduit through which a main flow of a fluid may be passed; a probe inserted in a portion of said conduit, said probe having an inlet opening which faces downstream with respect to the conduit and which communicates with an outlet opening which is disposed in an end surface of the probe, the said end surface being disposed within and spaced from the wall of the conduit; the said main flow, in passing in operation through the conduit, causing a sampling flow of the fluid to be drawn from the conduit and to be passed through the probe from the inlet opening to the outlet opening and so back to the conduit; and testing means for testing and sampling flow.

11. Apparatus for testing a fluid comprising a conduit through which a main flow of a fluid may be passed, a circular cylindrical probe inserted in a portion of said conduit, said probe having an inlet opening which faces downstream with respect to the conduit and which communicates with an outlet opening which is disposed in an end surface of the probe, the said end surface being disposed within and spaced from the wall of the conduit; the said main flow, in passing in operation through the conduit, causing a sampling flow of the fluid to be drawn from the conduit and to be passed through the probe from the inlet opening to the outlet opening and so back to the conduit, and testing means for testing said sampling flow.

12. Apparatus as claimed in claim 10 in which the outlet opening is disposed in a reduced diameter end surface of the probe.

13. Apparatus as claimed in claim 10 in which the pressure in the inlet opening is substantially equal to the static pressure in the conduit.

14. Apparatus for testing a fluid comprising a conduit through which a main flow of a fluid may be passed, the conduit having a recess therein; a probe inserted in a portion of said conduit, said probe havng an inlet opening disposed within said recess, the inlet opening facing downstream with respect to the conduit and communicating with an outlet opening which is disposed in an end surface of the probe, the said end surface being disposed within and spaced from the wall of the conduit; the said main flow, in passing in operation through the conduit, causing a sampling flow of the fluid to be drawn from the conduit and to be passed through the probe from the inlet opening to the outlet opening and so back to the conduit; and testing means for testing said sampling flow.

15. Apparatus for testing a fluid comprising a conduit through which a main flow of a fluid may be passed; a probe inserted in a portion of said conduit, said probe having an inlet opening which faces downstream with respect to the conduit and which communicates with an outlet opening which is disposed in an end surface of the probe, the said end surface being disposed within and spaced from the wall of the conduit, the inlet opening communicating with a passage which leads to a recess in the probe, said recess having a diameter which is substantially greater than that of the passage, and said recess having an open end which constitutes the said outlet opening; the said main flow, in passing in operation through the conduit, causing a sampling flow of the fluid to be drawn from the conduit and to be passed through the probe from the inlet opening to the outlet opening and so back to the conduit; and testing means for testing said sampling flow.

16. Apparatus as claimed in claim 10 in which a shield is mounted on the probe to shield the said outlet opening.

17. Apparatus for testing a fluid comprising a conduit through which a main flow of a fluid may be passed; a chamber communicating with said conduit; a probe inserted in said chamber, said probe sidewall having an inlet opening which is disposed in the chamber and which is open to the static pressure in the conduit; the probe having an outlet opening which communicates with the inlet opening and is disposed in an end surface of the probe, the said end surface being disposed within and spaced from the wall of the conduit; the said main flow, in passing in operation through the conduit, causing a sampling flow of the fluid to be drawn from the conduit and to be passed through the probe from the inlet opening to the outlet opening and so back to the conduit; and testing means for testing said sampling flow.

18. Apparatus as claimed in claim 17 in which the outlet opening is disposed in a reduced diameter end surface of the probe.

19. Apparatus for testing a fluid comprising a conduit through which the main flow of a fluid may be passed; a chamber communicating with said conduit; a probe inserted in said chamber and having an inlet opening which is disposed in the chamber and which is open to the static pressure in the conduit; a passage in said probe which communicates with the inlet opening and with a recess in the probe, said recess having a diameter which is substantially greater than that of the passage, and said recess having an open end which constitutes an outlet opening of the probe which is disposed in an end surface of the probe, the said end surface being disposed within and spaced from the wall of the conduit; the said main flow, in passing in operation through the conduit, causing a sampling flow of the fluid to be drawn from the conduit and to be passed through the probe from the inlet opening to the outlet opening and so back to the conduit; and testing means for testing said sampling flow.

20. Apparatus as claimed in claim 17 in which a shield is mounted on the probe to shield the said outlet opening.

21. A method of testing a fluid comprising passing a main flow of a fluid through a conduit, inserting into said conduit a probe having an inlet opening which faces downstream of the conduit and which communicates with an outlet opening which is disposed in an end surface of the probe, the inlet opening being spaced from said end surface, and the said end surface being disposed within and spaced from the wall of the conduit; the said main flow, in passing through the conduit, causing a sampling flow of the fluid to be drawn from the conduit, and to be passed through the probe from the inlet opening to the outlet opening, and so back to the conduit; and testing said sampling flow.

22. A method as claimed in claim 21 in which the inlet opening is disposed nearer to the wall of the conduit than to the said end surface.

23. Apparatus for testing a fluid comprising a conduit through which a main flow of a fluid may be passed; a probe inserted in said conduit, said probe having an inlet opening which faces downstream of the conduit and which communicates with an outlet opening which is disposed in an end surface of the probe, the inlet opening being spaced from said end surface, and the said end surface being disposed within and spaced from the wall of the conduit; the said main flow, in passing in operation through the conduit, causing a sampling flow of the fluid to be drawn from the conduit and to be passed through the probe from the inlet opening to the outlet opening and so back to the conduit; and testing means for testing said sampling flow.

24. Apparatus as claimed in claim 23 in which the inlet opening is disposed nearer to the wall of the conduit than to the said end surface.

* * * * *

UNITED STATES PATENT AND TRADEMARK OFFICE
CERTIFICATE OF CORRECTION

PATENT NO. : 4,215,565
DATED : August 5, 1980
INVENTOR(S) : KLAUS J. ZANKER

It is certified that error appears in the above—identified patent and that said Letters Patent is hereby corrected as shown below:

Column 1, line 62, "cyclindrical" should read --cylindrical--. Column 4, line 28, "disclosd" should read --disclosed--. Column 5, line 56, the equation should read $(P_4-P_3)/q = 1.2$. Column 6, line 4, "FIG" should read --FIGS.--; Column 6, line 24, the equation should read $(P_4-P_5)/q = 1.8$. Column 7, line 15, the equation should read $(P_4-P_5)/q$.

Signed and Sealed this

Fifth Day of May 1981

[SEAL]

Attest:

RENE D. TEGTMEYER

Attesting Officer    Acting Commissioner of Patents and Trademarks